US012585355B2

(12) United States Patent
Hisquin

(10) Patent No.: US 12,585,355 B2
(45) Date of Patent: Mar. 24, 2026

(54) DEVICE FOR RECEIVING AND IDENTIFYING A BOOK AND ITS PAGES

(71) Applicant: BUGALI, Paris (FR)

(72) Inventor: François Hisquin, Le Vésinet (FR)

(73) Assignee: BUGALI, Paris (FR)

( * ) Notice: Subject to any disclaimer, the term of this patent is extended or adjusted under 35 U.S.C. 154(b) by 0 days.

(21) Appl. No.: 18/864,842

(22) PCT Filed: May 12, 2023

(86) PCT No.: PCT/EP2023/062832
§ 371 (c)(1),
(2) Date: Nov. 11, 2024

(87) PCT Pub. No.: WO2023/218065
PCT Pub. Date: Nov. 16, 2023

(65) Prior Publication Data
US 2025/0306698 A1     Oct. 2, 2025

(30) Foreign Application Priority Data

May 13, 2022     (FR) ................................. 22173301.7

(51) Int. Cl.
*G06F 3/03*          (2006.01)
*G06F 3/041*         (2006.01)
(Continued)

(52) U.S. Cl.
CPC ............ *G06F 3/04162* (2019.05); *G06F 3/03* (2013.01); *G06F 3/0448* (2019.05); *G06F 3/045* (2013.01); *G06F 3/016* (2013.01); *G06F 3/165* (2013.01)

(58) Field of Classification Search
CPC ...... G06F 3/04162; G06F 3/03; G06F 3/0448; G06F 3/045; G06F 3/016; G06F 3/165; B42D 1/009; B42D 3/12; G09B 5/062
See application file for complete search history.

(56) References Cited

U.S. PATENT DOCUMENTS

| | | | |
|---|---|---|---|
| 6,529,920 B1 * | 3/2003 | Arons ................... | G06F 16/686 |
| | | | 715/268 |
| 6,839,848 B1 * | 1/2005 | Kirikoshi .............. | G06F 21/123 |
| | | | 726/2 |

(Continued)

FOREIGN PATENT DOCUMENTS

| | | | |
|---|---|---|---|
| EP | 3923125 A1 | 12/2021 | |
| WO | 2011033369 A1 | 3/2011 | |
| WO | 2023/218065 A1 | 11/2023 | |

OTHER PUBLICATIONS

ISR-WO date Aug. 10, 2023 for parent application PCT/EP2023/062832 (WO2023/218065).

*Primary Examiner* — Rodney Amadiz
(74) *Attorney, Agent, or Firm* — Tutunjian & Bitetto, P.C.

(57)     ABSTRACT

It is proposed a device (1) configured for receiving a book (2), said book comprising a book-identifier and a page; wherein said device comprises: a user input detection device; a book-identifier detection device configured to detect the book-identifier of the book; an output device; a controller connected to the user input detection device, the book-identifier detection device and the output device; and a first fastening means to removably fasten the device to the book; wherein the controller is configured to determine the user input based on the signal from the user input detection device; and wherein the controller is configured to determine which book is fastened to the device based on the signal from the book-identifier detection device. It is also proposed a book configured to be fastened to the device according to the invention and an interactive book system comprising a device and a book according to the invention.

11 Claims, 15 Drawing Sheets

| | Sensors on the 1st side | | | | | | | | Sensors on the 2nd side | | | | | | | |
|---|---|---|---|---|---|---|---|---|---|---|---|---|---|---|---|---|
| 0 | | | | | | | | | X | X | X | X | X | X | X | X |
| Page 1 | | | | | | | | X | X | X | X | X | X | X | X | X |
| Page 2 | | | | | | | X | X | X | X | X | X | X | X | X | X |
| Page 3 | | | | | | X | X | X | X | X | X | X | X | X | X | X |
| Page 4 | | | | | X | X | X | X | X | X | X | X | X | X | X | X |
| Page 5 | | | | X | X | X | X | X | X | X | X | X | X | X | X | X |
| Page 6 | | | X | X | X | X | X | X | X | X | X | X | X | X | X | X |
| Page 7 | | X | X | X | X | X | X | X | X | X | X | X | X | X | X | X |
| Page 8 | X | X | X | X | X | X | X | X | X | X | X | X | X | X | X | X |
| Page 9 | X | X | X | X | X | X | X | X | | X | X | X | X | X | X | X |
| Page 10 | X | X | X | X | X | X | X | X | | | X | X | X | X | X | X |
| Page 11 | X | X | X | X | X | X | X | X | | | | X | X | X | X | X |
| Page 12 | X | X | X | X | X | X | X | X | | | | | X | X | X | X |
| Page 13 | X | X | X | X | X | X | X | X | | | | | | X | X | X |
| Page 14 | X | X | X | X | X | X | X | X | | | | | | | X | X |
| Page 15 | X | X | X | X | X | X | X | X | | | | | | | | X |
| Page 16 | X | X | X | X | X | X | X | X | | | | | | | | |

| | Sensors on the 1st side | | | | | | | | Sensors on the 2nd side | | | | | | | |
|---|---|---|---|---|---|---|---|---|---|---|---|---|---|---|---|---|
| 0 | | | | | | | | | X | X | X | X | X | X | X | X |
| Page 1 | X | | | | | | | | X | X | X | X | X | X | X | X |
| Page 2 | X | X | | | | | | | X | X | X | X | X | X | X | X |
| Page 3 | X | X | X | | | | | | X | X | X | X | X | X | X | X |
| Page 4 | X | X | X | X | | | | | X | X | X | X | X | X | X | X |
| Page 5 | X | X | X | X | X | | | | X | X | X | X | X | X | X | X |
| Page 6 | X | X | X | X | X | X | | | X | X | X | X | X | X | X | X |
| Page 7 | X | X | X | X | X | X | X | | X | X | X | X | X | X | X | X |
| Page 8 | X | X | X | X | X | X | X | X | X | X | X | X | X | X | X | X |
| Page 9 | X | X | X | X | X | X | X | X | | X | X | X | X | X | X | X |
| Page 10 | X | X | X | X | X | X | X | X | | | X | X | X | X | X | X |
| Page 11 | X | X | X | X | X | X | X | X | | | | X | X | X | X | X |
| Page 12 | X | X | X | X | X | X | X | X | | | | | X | X | X | X |
| Page 13 | X | X | X | X | X | X | X | X | | | | | | X | X | X |
| Page 14 | X | X | X | X | X | X | X | X | | | | | | | X | X |
| Page 15 | X | X | X | X | X | X | X | X | | | | | | | | X |
| Page 16 | X | X | X | X | X | X | X | X | | | | | | | | |

(51) Int. Cl.
  *G06F 3/044*     (2006.01)
  *G06F 3/045*     (2006.01)
  *G06F 3/01*      (2006.01)
  *G06F 3/16*      (2006.01)

(56)        References Cited

U.S. PATENT DOCUMENTS

| | | | |
|---|---|---|---|
| 7,428,990 B1 | 9/2008 | Milford | |
| 8,538,318 B2 | 9/2013 | Wallace | |
| 2011/0059426 A1* | 3/2011 | Mamigonians | G09B 5/062 |
| | | | 434/317 |
| 2013/0168954 A1* | 7/2013 | Koren | G06F 40/169 |
| | | | 281/15.1 |
| 2021/0389927 A1* | 12/2021 | Yang | G06K 7/081 |
| 2023/0115679 A1* | 4/2023 | Misterek | H04N 21/436 |
| | | | 345/156 |

* cited by examiner

| | Sensors on the 1st side | | | | | | | | Sensors on the 2nd side | | | | | | | |
|---|---|---|---|---|---|---|---|---|---|---|---|---|---|---|---|---|
| 0 | | | | | | | | | X | X | X | X | X | X | X | X |
| Page 1 | | | | | | | | X | X | X | X | X | X | X | X | X |
| Page 2 | | | | | | | X | X | X | X | X | X | X | X | X | X |
| Page 3 | | | | | | X | X | X | X | X | X | X | X | X | X | X |
| Page 4 | | | | | X | X | X | X | X | X | X | X | X | X | X | X |
| Page 5 | | | | X | X | X | X | X | X | X | X | X | X | X | X | X |
| Page 6 | | | X | X | X | X | X | X | X | X | X | X | X | X | X | X |
| Page 7 | | X | X | X | X | X | X | X | X | X | X | X | X | X | X | X |
| Page 8 | X | X | X | X | X | X | X | X | X | X | X | X | X | X | X | X |
| Page 9 | X | X | X | X | X | X | X | X | | X | X | X | X | X | X | X |
| Page 10 | X | X | X | X | X | X | X | X | | | X | X | X | X | X | X |
| Page 11 | X | X | X | X | X | X | X | X | | | | X | X | X | X | X |
| Page 12 | X | X | X | X | X | X | X | X | | | | | X | X | X | X |
| Page 13 | X | X | X | X | X | X | X | X | | | | | | X | X | X |
| Page 14 | X | X | X | X | X | X | X | X | | | | | | | X | X |
| Page 15 | X | X | X | X | X | X | X | X | | | | | | | | X |
| Page 16 | X | X | X | X | X | X | X | X | | | | | | | | |

Figure 11

| | Sensors on the 1st side | | | | | | | | Sensors on the 2nd side | | | | | | | |
|---|---|---|---|---|---|---|---|---|---|---|---|---|---|---|---|---|
| 0 | | | | | | | | | X | X | X | X | X | X | X | X |
| Page 1 | X | | | | | | | | X | X | X | X | X | X | X | X |
| Page 2 | X | X | | | | | | | X | X | X | X | X | X | X | X |
| Page 3 | X | X | X | | | | | | X | X | X | X | X | X | X | X |
| Page 4 | X | X | X | X | | | | | X | X | X | X | X | X | X | X |
| Page 5 | X | X | X | X | X | | | | X | X | X | X | X | X | X | X |
| Page 6 | X | X | X | X | X | X | | | X | X | X | X | X | X | X | X |
| Page 7 | X | X | X | X | X | X | X | | X | X | X | X | X | X | X | X |
| Page 8 | X | X | X | X | X | X | X | X | X | X | X | X | X | X | X | X |
| Page 9 | X | X | X | X | X | X | X | X | | X | X | X | X | X | X | X |
| Page 10 | X | X | X | X | X | X | X | X | | | X | X | X | X | X | X |
| Page 11 | X | X | X | X | X | X | X | X | | | | X | X | X | X | X |
| Page 12 | X | X | X | X | X | X | X | X | | | | | X | X | X | X |
| Page 13 | X | X | X | X | X | X | X | X | | | | | | X | X | X |
| Page 14 | X | X | X | X | X | X | X | X | | | | | | | X | X |
| Page 15 | X | X | X | X | X | X | X | X | | | | | | | | X |
| Page 16 | X | X | X | X | X | X | X | X | | | | | | | | |

Figure 12

DEVICE FOR RECEIVING AND IDENTIFYING A BOOK AND ITS PAGES

FIELD OF THE INVENTION

The present invention pertains to the field of books. More specifically, the present invention relates to a device configured for receiving a book, to a book and to an interactive book system comprising a device and a book. The present invention has applications in educational books increasing the interest and interactivity of the readings.

BACKGROUND OF THE INVENTION

Most of the interactive books on the market today are provided with an embedded interactive device, such as a speaker or a vibrating device.

Due to the presence of an interactive device in each book, the production cost of the books is generally high, and the quality of the interactive device is low.

In addition, the interactive books are restricted in terms of interaction. Usually, the user can press a limited number of buttons or touch a limited number of dedicated positions. The user input on the buttons or on the positions always causes the same output signal, usually a sound or a vibrating pattern. It is also known to use a stylus, such as a wired stylus or a Bluetooth stylus.

Another problem with interactive books on the market today is that each book necessarily includes a cumbersome active page-identifier device (for instance an optical system). Hence, the book is cumbersome, impractical and requires frequent change of battery.

Accordingly, there is still a need to provide an interactive book without suffering from the above-described drawbacks.

The present invention lies within this context.

SUMMARY OF THE INVENTION

According to a first aspect of the invention, there is provided a device configured for receiving a book, said book comprising a book-identifier and a page; wherein said device comprises:

a user input detection device;

a book-identifier detection device configured to detect the book-identifier of the book;

an output device;

a controller connected to the user input detection device, the book-identifier detection device and the output device; and a first fastening means configured to removably fasten the device to the book;

wherein the controller is configured to determine the user input based on the signal from the user input detection device; and wherein the controller is configured to determine which book is fastened to the device based on the signal from the book-identifier detection device.

According to preferred embodiments, the proposed device may also comprise at least one of the following additional features:

the book comprises a plurality of pages and each page of the book that needs to be identified comprises a page-identifier; the device further comprises a page-identifier detection device configured to detect the page-identifiers of the book; and the controller is connected to the page-identifier detection device and configured to determine a current page (i.e., on which page the book is open) based on the signal from the page-identifier detection device.

the book comprises a plurality of pages and each page of the book comprises a page-identifier; the device further comprises a page-identifier detection device configured to detect the page-identifiers of the book; and the controller is connected to the page-identifier detection device and configured to determine a current page (i.e., on which page the book is open) based on the signal from the page-identifier detection device.

the page-identifier detection device comprises a plurality of sensors, such as inductive sensors, and each sensor is configured to correspond with a page-identifier of the book, preferably with two page-identifiers of the book.

the number of sensors is equal to the number of page-identifiers of the book.

the user input detection device comprises a resistive touch panel or a capacitive touch panel and the controller is configured to determine the user input based on the signal from the resistive touch panel or the capacitive touch panel.

the user input detection device comprises a finger resistive touch panel or a finger capacitive touch panel and the controller is configured to determine a finger gesture based on the signal from the finger resistive touch panel or the finger capacitive touch panel.

the device comprises two book-identifier detection devices.

the book-identifier detection device comprises a near-field communication (NFC) tag reader or a radio-frequency identification (RFID) tag reader and the controller is configured to determine which book is fastened to the device based on the signal from the near-field communication (NFC) tag reader or the radio-frequency identification (RFID) tag reader.

the first fastening means comprises a magnetic or ferrous material configured to fasten the book to the device using magnetic attraction.

the output device comprises a speaker, a lighting device and/or a haptic device;

the device further comprises, connected to the controller, a jack female connector and/or an USB female connector, such as a mini-USB connector or a USB-C connector.

the device further comprises, connected to the controller, a on-off button, a volume button and/or a button configured to select a language.

According to a second aspect of the invention there is provided a book configured to be fastened to the device according to the first aspect; wherein the book comprising:

a book-identifier;

a page; and a second fastening means configured to removably fasten the book to the first fastening means of the device.

According to preferred embodiments, the proposed book may also comprise at least one of the following additional features:

the book further comprises a binding system and a plurality of pages connected to the binding system; and each page that needs to be identified comprises a page-identifier.

the book further comprises a binding system and a plurality of pages connected to the binding system; and each page comprises a page-identifier.

the page-identifier detection device of the device comprises a plurality of sensors, such as inductive sensors.

Each page-identifier, such as a metallic marker, is con-
figured to correspond with a sensor, preferably with
two sensors of the device.

for each page of the book, the page-identifier overlaps
with the page-identifier of a different page, preferably
one different page, when the book is closed.

for each page of the book, the page-identifier overlaps
with the page-identifier of a different page, preferably
one different page, when the book is closed and viewed
from the above.

the book-identifier comprises a near-field communication
(NFC) tag or a radio-frequency identification (RFID)
tag.

the second fastening means comprises a magnetic or
ferrous material configured to fasten the book to the
device using magnetic attraction.

the second fastening means comprise or consist of a
metallic ring binding system, such as a wire-o binding
system.

According to a third aspect of the invention there is
provided an interactive book system comprising a device
according to the first aspect of the invention and a book
according to the second aspect of the invention.

A fourth aspect of the invention is directed to the use of
the interactive book system as an educational book system
increasing the interest and interactivity of the readings.

BRIEF DESCRIPTION OF THE DRAWINGS

The invention will be more clearly understood from the
following description, given by way of example only, with
reference to the accompanying drawings, in which:

FIG. 11 illustrates a schematic diagram of the detection of
the current page of the book according to embodiments of
the invention.

FIG. 12 illustrates a schematic diagram of the detection of
the current page of the book according to embodiments of
the invention.

FIGS. 1A, 2A, 3A, 8A and 9A differ from FIGS. 1, 2, 3,
8 and 9, respectively, mainly in that the device does not
comprise polarising stops 191, 192 and the book does not
comprise polarising notches 261, 262.

FIG. 7A differs from FIG. 7, mainly in that the second
fastening means comprises two magnets instead of a metal-
lic bar and the card does not comprise polarising notches
331, 332.

DETAILED DESCRIPTION OF THE
INVENTION

Device

Referring to FIGS. 1, 1A, 2 and 2A, a device 1 configured
for receiving a book according to embodiments of the
invention is depicted.

The device 1 is configured for receiving a removable book
2, 3.

According to embodiments, the device is not foldable.

Figure 1:
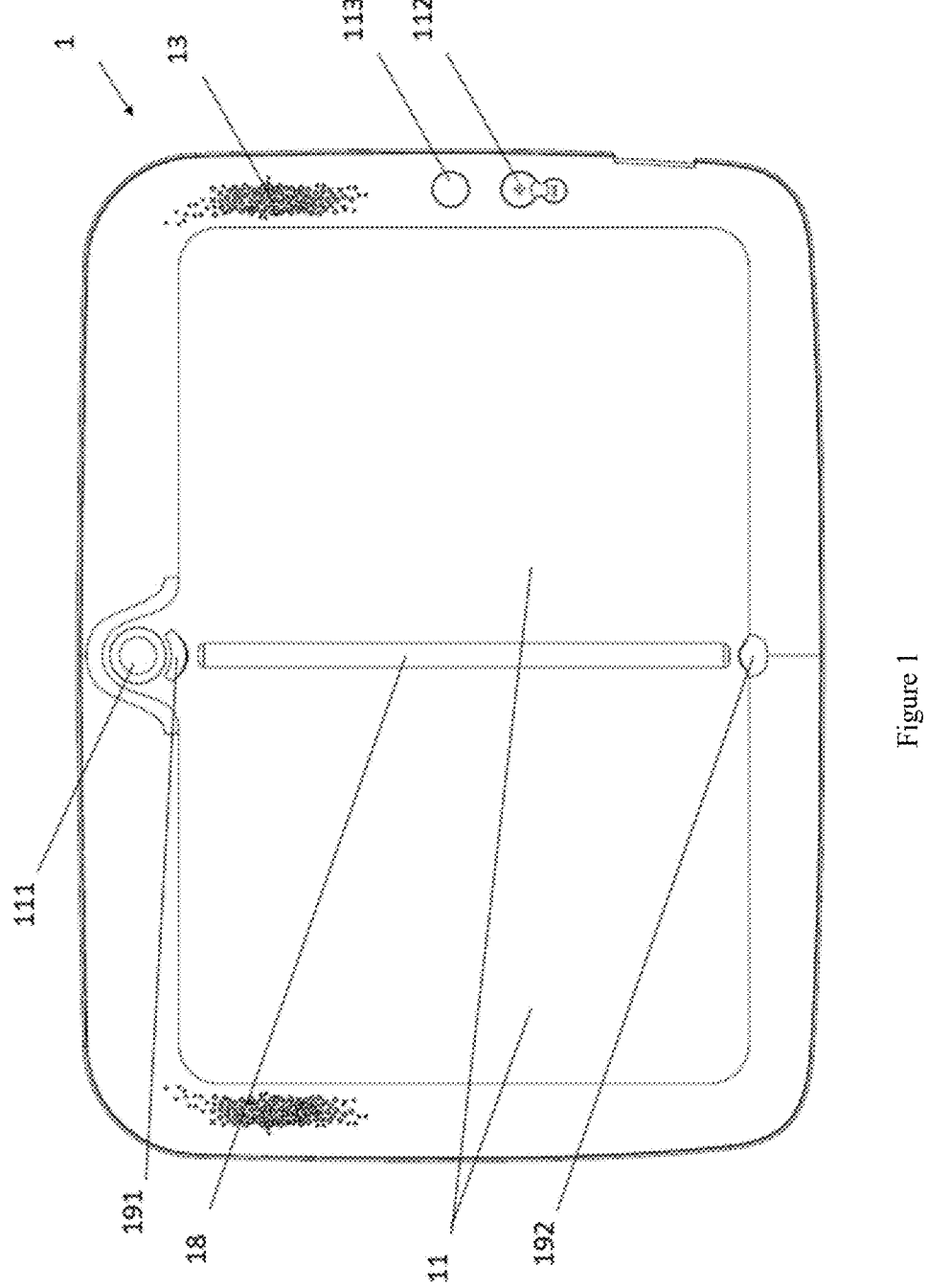
FIG. 1 illustrates a front view of a device according to
embodiments of the first aspect of the invention.

According to embodiments depicted in FIG. 1, to ensure
proper positioning of the book on the device, the device
further comprises a polarising stop 191, 192. The polarising
stop is configured to cooperate with a polarising notch in the
book. According to embodiments, the device comprises at
least two polarising stops 191, 192, configured to cooperate
with at least two polarising notches on the book, preferably
two polarising notches located on a different edge of the
book.

Figure 1A:
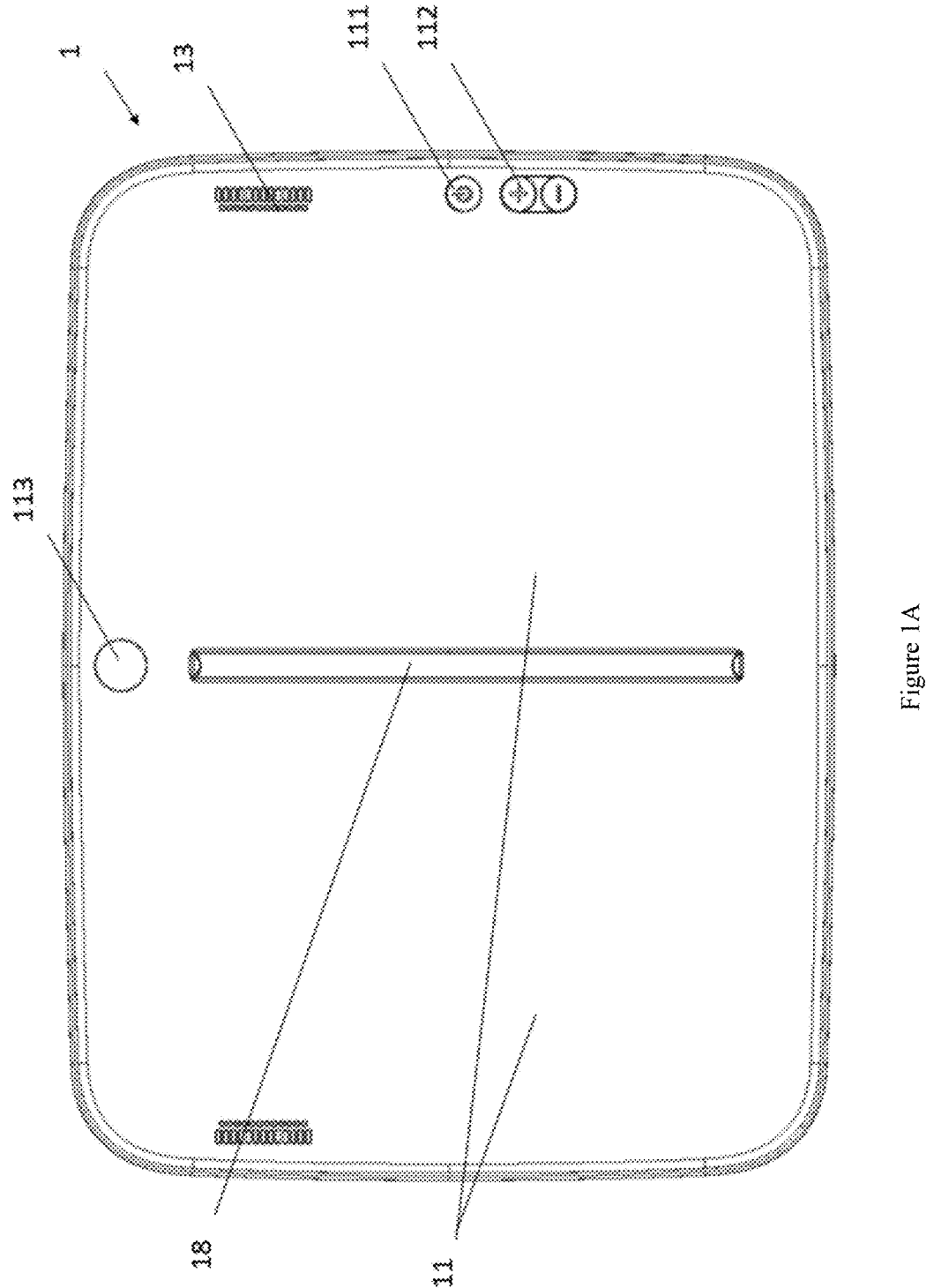
FIG. 1A illustrates a front view of a device according to
other embodiments of the first aspect of the invention.

According to embodiments depicted in FIG. 1A, the
device does not comprise any polarising stop.

The device comprises first fastening means 15 configured
to fasten the device to a book. According to embodiments,
the first fastening means are configured to fasten the device
to a second fastening means 25, 35 of a book 2, 3.

According to embodiments, the device comprises active
first fastening means, such as magnet, configured to be
fastened to passive second fastening means of a book, such
a metallic ring binding system, a metallic wire-o or a
metallic bar, using magnetic attraction.

According to embodiments, the device comprises active
first fastening means, such as magnet, configured to be
fastened to active second fastening means of a book, such as
magnet.

According to embodiments, the device comprises passive
first fastening means, such a metallic bar or metallic disk,
configured to be fastened to active second fastening means
of a book, such as magnet, using magnetic attraction.

According to embodiments, the device comprises a notch
18 configured to receive the binding system of the book.

Figure 2:
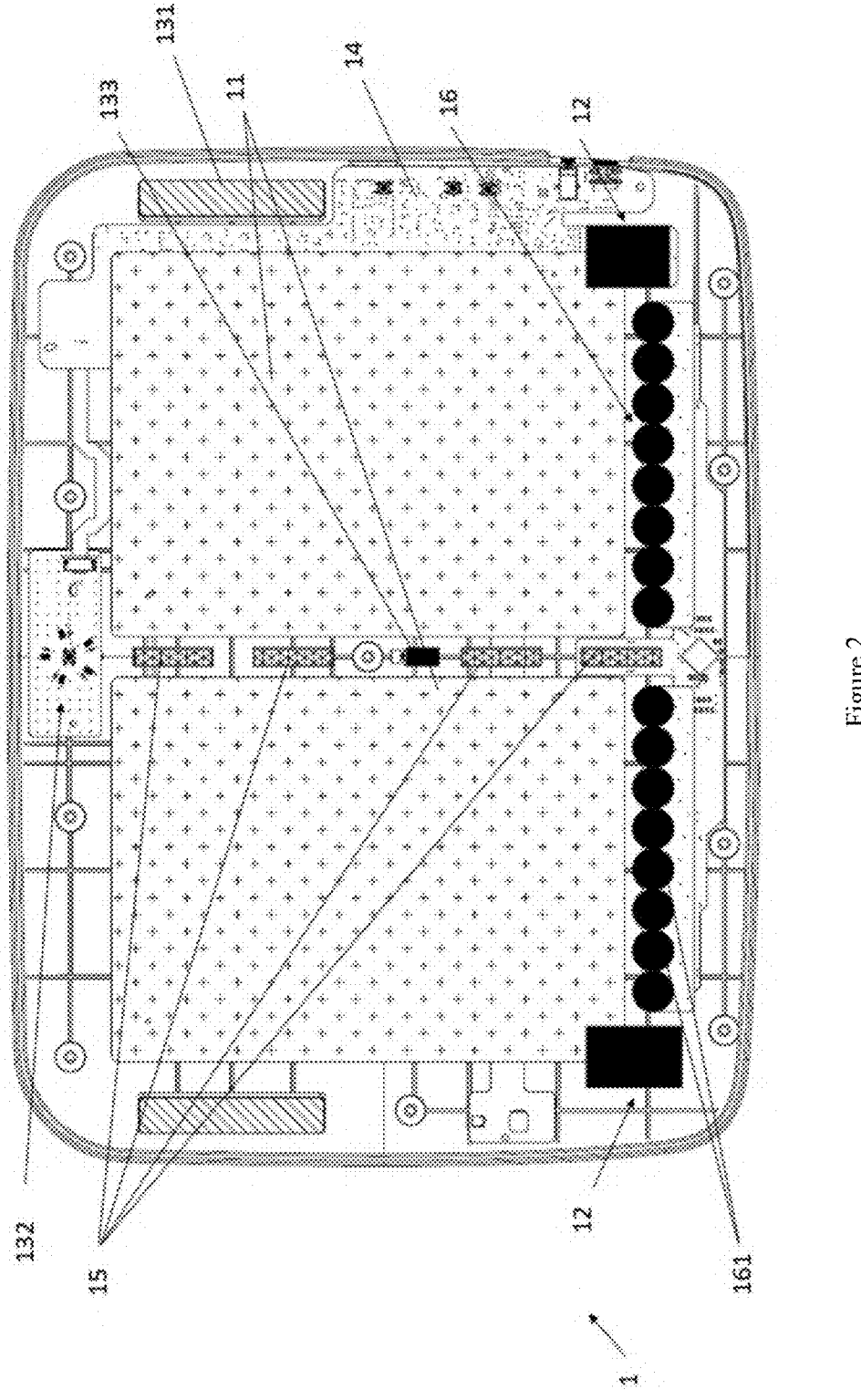
FIG. 2 illustrates a front view of a device according to
embodiments of the first aspect of the invention, wherein the
front cover is removed.

According to embodiments, the first fastening means are
positioned below the notch 18. According to embodiments,
the first fastening means are positioned on each side of the
notch 18. According to embodiments, the first fastening means may be positioned elsewhere in the device. According to embodiments, the first fastening means are positioned on each side of the notch 18 and/or below the notch 18. To improve fastening of the removable book 2 within the device 1, at least two fastening means, preferably four fastening means 15—as depicted in FIG. 2—, may be disposed apart from each other below the notch 18.

Figure 2A:
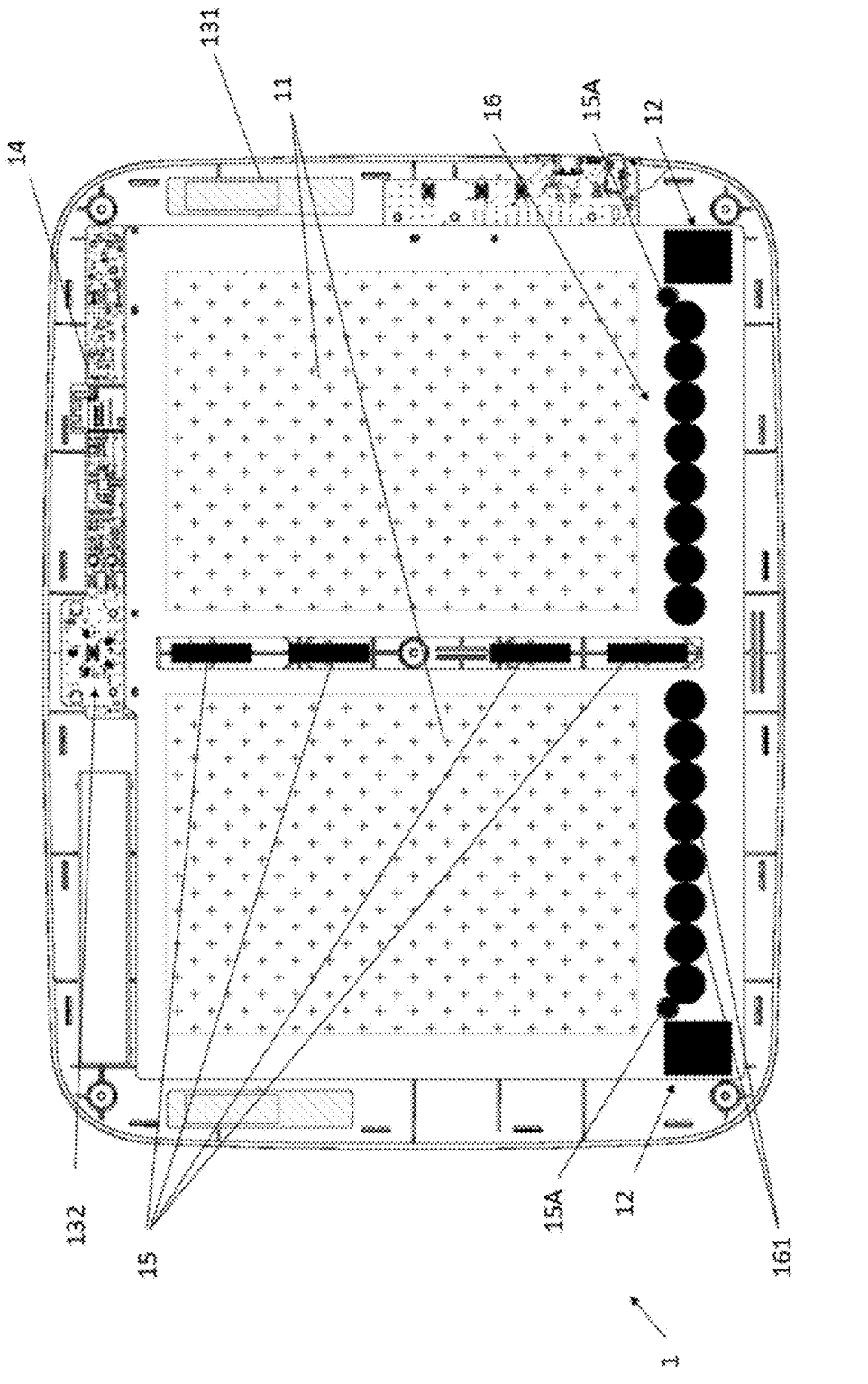
FIG. 2A illustrates a front view of a device according to
other embodiments of the first aspect of the invention,
wherein the front cover is removed.

According to embodiments, as depicted in FIG. 2A, at least two fastening means, preferably four fastening means 15, are disposed apart from each other below the notch 18 and at least two additional fastening means 15A are disposed on each side of the notch 18.

According to embodiments depicted in FIG. 1, the polarising stop is aligned with the notch 18. According to said embodiments, the two polarising stops 191, 192 are aligned with the notch 18, one polarising stop being disposed on each side of the notch 18.

According to embodiments, the device comprises a first side configured to receive the pages of a book on a first side and a second side configured to receive the pages of a book on a second side. According to embodiments, the first side and the second side are disposed on each side of the notch 18.

The device 1 further comprises a controller 14 which will be described in detail below.

The device 1 further comprises a user input detection device 11 connected to the controller. The user input detection device is a touch panel, such as a finger touch panel, either resistive or capacitive. The touch panel increases the interactivity of the interactive system of the prior art by allowing detection of multiples movements of the user; for instance, click, drag, double click, two finger pinch.

According to embodiments, the touch panel further allows detection of movements such as triple clicks, circles—for instance to surround one or a plurality of objects—, cycling clicks—for instance the control system may initiate different interactions when the user press a second time or more at the same place—.

According to embodiments, the device comprises two user input detection devices, one on each side of the device. According to preferred embodiments, the user input detection device is a capacitive touch panel such as for instance a self-capacitive touch panel or a mutual capacitive touch panel, more preferably a mutual capacitive touch panel. Capacitive touch panels as such are known to one skilled in the art. According to embodiments, known capacitive touch panels have been modified to improve the detection of a user input through pages of a book. According to embodiments, the electrodes of the touch panel have a diamond structure. According to embodiments, the gap between a transmitting electrode (Tx) and a receiving electrode (Rx), preferably the gap between a transmitting electrode (Tx) and a receiving electrode (Rx) in a diamond structure, is ranging from 1 mm to 1.4 mm preferably from 1.1 mm to 1.3 mm, more preferably 1.2 mm. According to embodiments, the ground plane has a grid pattern, preferably a square grid pattern. According to embodiment, the size of the square of the square grid pattern is about 1.5 mm×1.5 mm.

Additional user input device may comprise, connected to the controller, an on-off button 111, a volume button 112 and/or a button configured to select a language 113.

The device further comprises a book-identifier detection device 12 connected to the controller, preferably two book-identifier detection devices. A book-identifier detection device is configured to correspond with a book-identifier of a book to identify the book. The book-identifier detection device 12 may be a near-field communication (NFC) tag reader or a radio-frequency identification (RFID) tag reader. The device may comprise two book-identifier detection devices to identify a book in at least two configurations or to detect a book that reads from left to right and from right to left. Thus, the device may be used with books that reads from right to left by used of the two book-identifier detection device 12 of the device. According to embodiments, one book-identifier detection device is positioned on each side of the device, preferably symmetrically with respect to the notch 18.

The device 1 comprises a page-identifier detection device 16 connected to the controller. According to embodiments and as depicted in FIGS. 2 and 2A, the page-identifier detection device 16 comprises a plurality of sensors 161, such as inductive sensors. According to embodiments, each sensor is configured to correspond with a page-identifier of the book. It means that each sensor can detect a corresponding page-identifier of the book when the page-identifier is sufficiently close to the sensor. According to embodiments, the number of sensors is superior or equal to the number of page-identifiers of the book, preferably equal. According to embodiments, half of the sensors are disposed on each side of the device. According to embodiments, the same number of sensors are disposed on each side of the device. According to embodiments, each sensor is configured to correspond with two page-identifiers of the book. It means that two page-identifiers may be sufficiently close to a corresponding sensor to be detected by the same sensor. According to embodiments, two page-identifiers may be sufficiently close to a corresponding sensor to be detected by the same sensor on each side of the device. Said embodiments enable to reduce the number of different locations wherein a sensor is positioned on each side of the device. A larger number of pages may be identified, or a smaller number of sensors may be used-thereby reducing the mechatronic footprint of the sensors on each side of the device.

According to embodiments, each sensor comprises a spiral coil. According to embodiments, the spiral coil comprises between 20 and 40 turns, preferably between 25 and 35 turns, more preferably 29 turns. According to embodiments, the distance between the turns is equal to the diameter of the wire. For instance, the spiral coil is made with a 0.1 mm wire and the distance between the turns is equal to 0.1 mm. According to embodiments, the internal diameter of the spiral coil is ranging from 1 to 5 mm, preferably about 2 mm. According to embodiments, the external diameter of the spiral coil is ranging from 10 to 15 mm, preferably about 13 mm.

According to embodiments, the sensors are aligned, preferably aligned near an outer edge of the device, such as the bottom side of the device. According to embodiments, on each side of the notch 18 of the device, the sensors are spaced by the same distance, preferably ranging from 10 mm to 25 mm, more preferably about 15 mm.

The device further comprises an output device 13 connected to the controller, such as a speaker 131, a lighting device 132, or a haptic device 133.

According to embodiments, the device further comprises, connected to the controller, a jack female connector and/or an USB female connector, such as a mini-USB connector or a USB-C connector.

Book

Referring to FIGS. 3 to 6, a book 2 according to embodiments of the invention is depicted. As depicted in the enlarged view of FIG. 4, the book comprises a plurality of pages 22 connected to a binding system 24, such as a ring binding system or a wire-o binding system. The book is foldable.

The book comprises a book-identifier 21, preferably one book-identifier. The book-identifier is preferably integrated within one page. For instance, the page comprises two sheets forming a page (for instance two sheets glued together) and the book-identifier is embedded into the two sheets. According to embodiments, the book-identifier is not visible. According to the embodiment depicted in FIG. 5, the book-identifier is integrated in the last page, especially for books that reads from left to right. According to embodiments, the book-identifier is integrated in the first page, especially for books that reads from right to left. The book-identifier 21 is configured to correspond with a book-identifier detection device 12 when the book is positioned on the device so that the controller can identify the book. The book-identifier may be any passive tag that may be read by the book-identifier detection device, such as for instance a near-field communication (NFC) tag or a radio-frequency identification (RFID) tag.

The book comprises a second fastening means 25. The second fastening means 25 is configured to be fastened to the first fastening means. According to embodiments, the second fastening means is a passive fastening means, such as a metallic means, configured to be fastened to an active first fastening means of the device, such as a magnet. According to embodiments, the second fastening means is a metallic ring binding system or metallic wire-o. Said embodiment enables to combine the binding system and the fastening means in a single system. As it is apparent to the skilled artisan, other fastening means, such as active fastening means (e.g., magnet) may be used. According to embodiments, the second fastening means is configured to cooperate with the notch 18 of the device. According to embodiments, the ring binding system or wire-o is configured to be received inside the notch 18 of the device.

Figure 3:
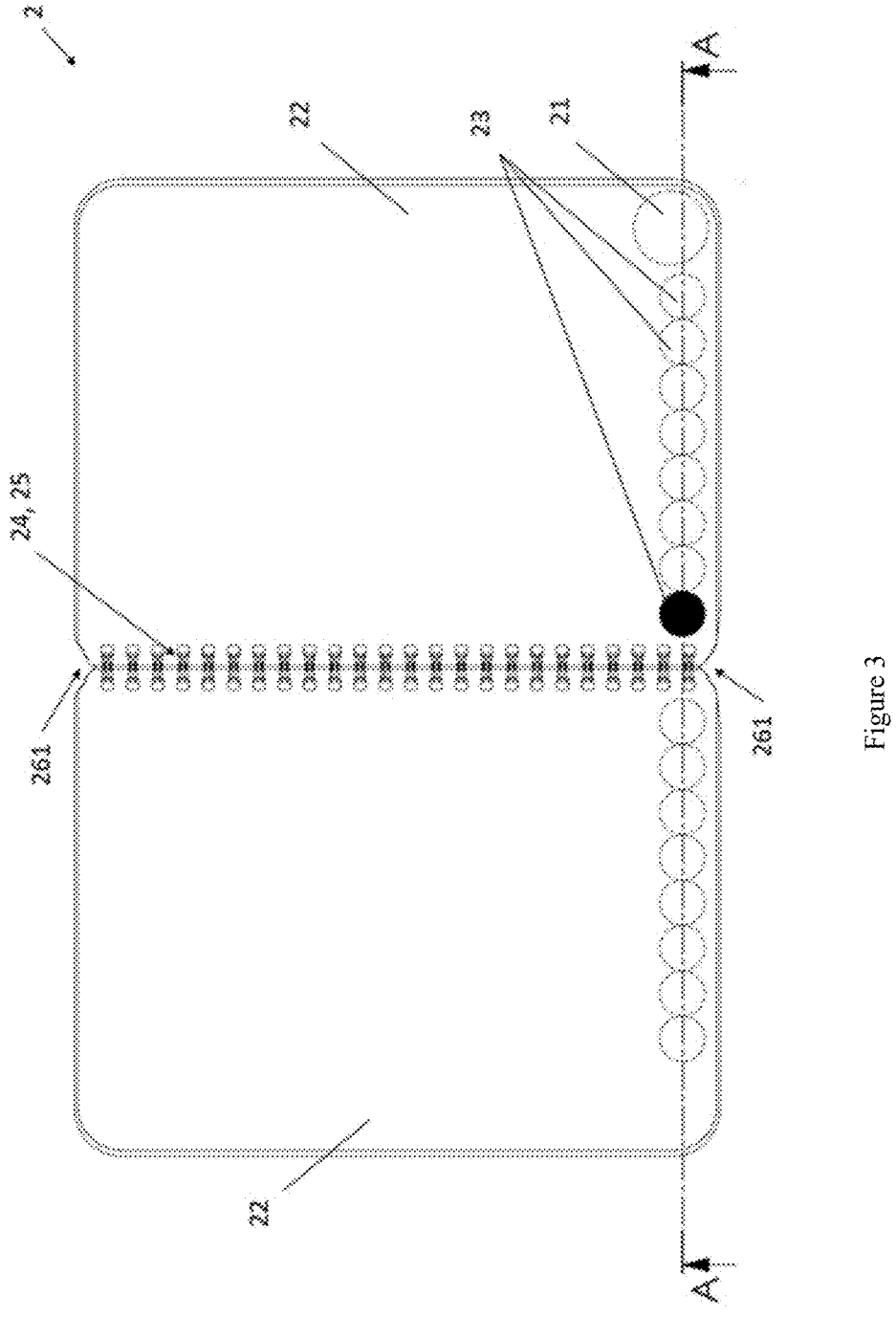
FIG. 3 illustrates a front view of a book according to
embodiments of the second aspect of the invention.

According to embodiments as illustrated in FIG. 3, the book comprises a polarising notch 261, 262 configured to cooperate with a polarising stop 191, 192 on the device to ensure proper positioning and orientation of the book on the device. According to embodiments, the polarising notch is positioned on an outer edge of the book. According to one embodiment, the book comprises at least two polarising notches 261, 262 configured to cooperate with at least two polarising stops 191, 192 on the device, preferably the polarising notches are positioned on a different outer edge of the book. According to the depicted embodiment, a polarising notch is positioned on each side of the binding system. According to embodiments, the first polarising notch and the second polarising notch have a different shape.

Figure 3A:
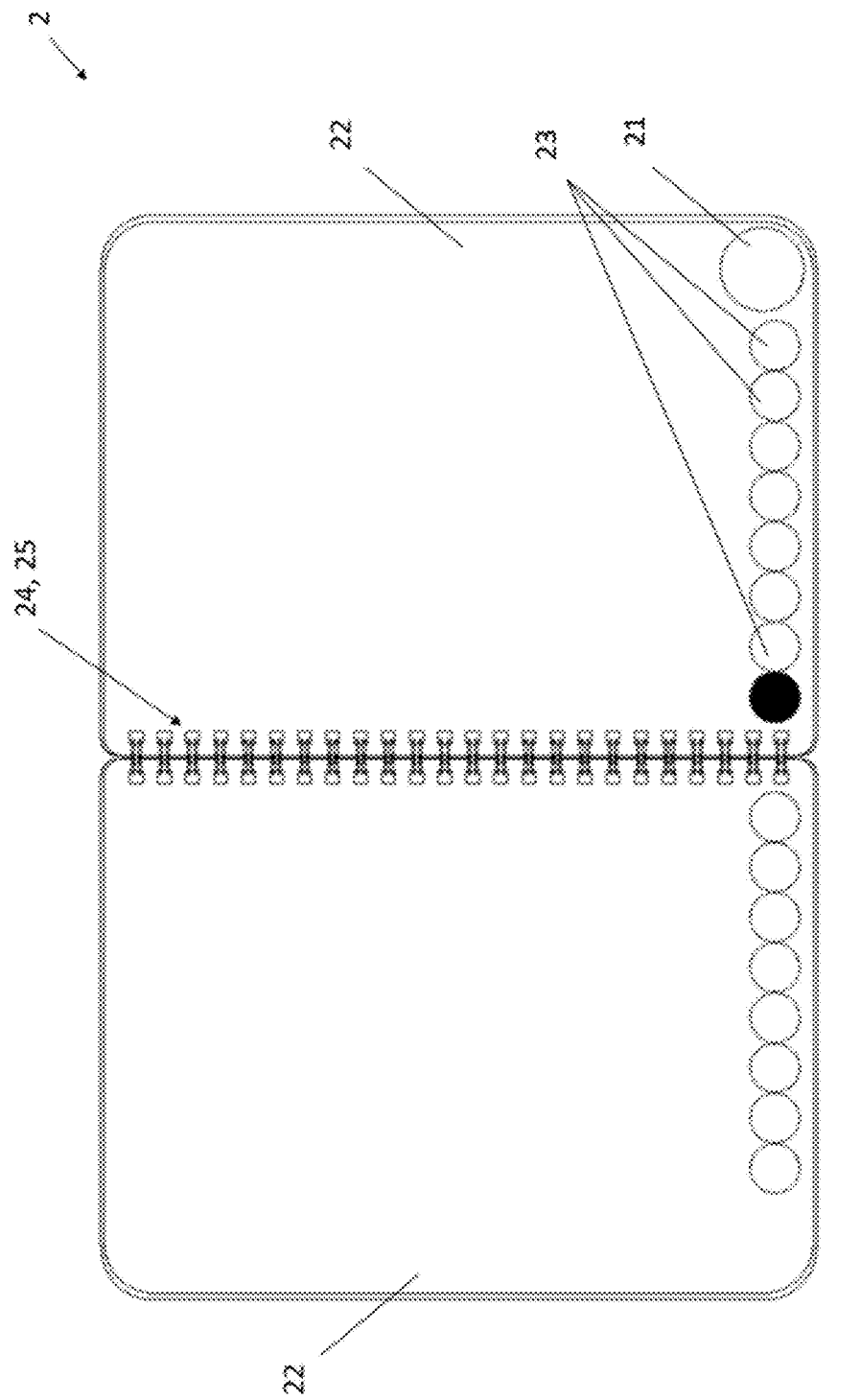
FIG. 3A illustrates a front view of a book according to
other embodiments of the second aspect of the invention.
Figure 4:
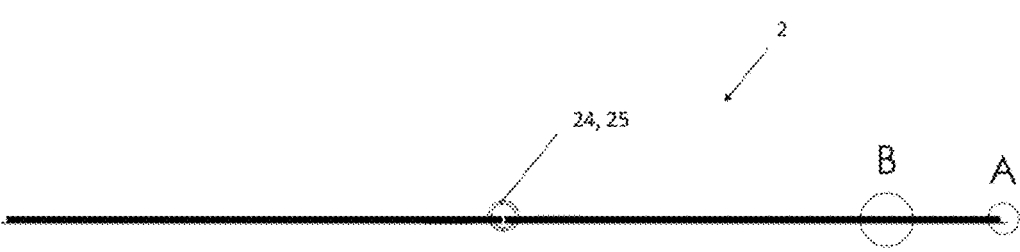
FIG. 4 illustrates a cross-sectional view of the book along
the line A-A denoted in FIG. 3.
Figure 5:
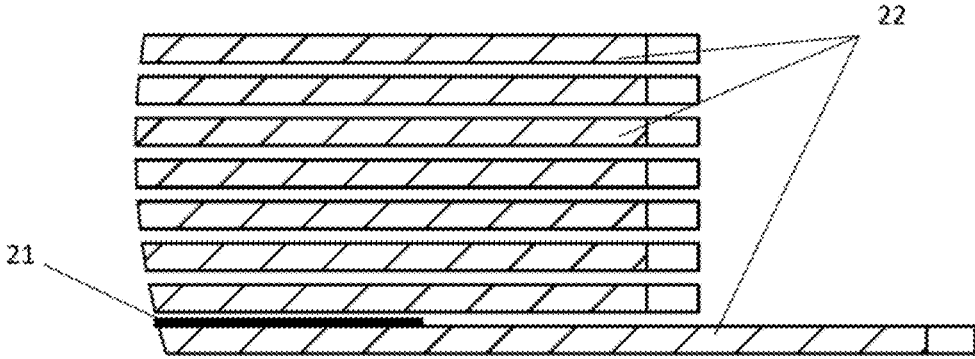
FIG. 5 illustrates an enlarged view of the circle denoted
with the letter A in FIG. 4.

According to embodiments as illustrated in FIG. 3A, the book does not comprise any polarising notch configured to cooperate with a polarising stop.

According to embodiments, a page comprises content on one side or on each side of the page. A story, a picture and/or a game may be printed on one side or on each side of a page.

Figure 6:
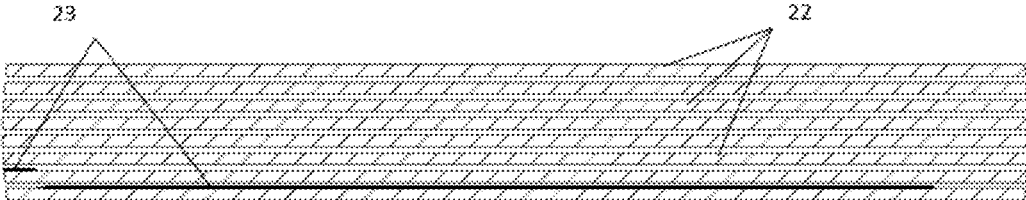
FIG. 6 illustrates an enlarged view of the circle denoted
with the letter B in FIG. 4.

Each page of the book that need to be identifiable comprises one page-identifier. Referring to FIG. 6, an enlarged view of the book 2 with two page-identifiers 23 on two different pages 22 is shown. According to embodiments, a page-identifier is integrated within each page. For instance, each page comprises two sheets forming a page (for instance two sheets glued together) and each page-identifier is embedded into the two sheets. According to embodiments, the page-identifier is not visible. According to embodiments, a page identifier comprises a metallic marker, such as a metallic disk. According to embodiments, the metallic disks have a diameter of at least 5 mm, at least 10 mm, at least 15 mm. According to embodiments, the metallic disks have a thickness of at least 50 μm. According to embodiments, the metallic disks have a thickness of less than 100 μm.

According to embodiments, a page-identifier of a page overlaps with the page-identifier of another page when the book is closed. According to embodiments, a page-identifier of a page overlaps with the page-identifier of one other page when the book is closed. It means that two page-identifiers have the same position, each on its page. By overlap, it is meant that two elements overlap when they are positioned at the same position when viewed from the above and when the device and/or the book lies on a flat horizontal surface. According to embodiments, the page-identifiers of two pages are positioned at the same position, in pairs.

The embodiment depicted in FIGS. 3 and 3A shows 8 different positions of page-identifiers for a book comprising 16 pages that can be detected by the device.

According to embodiments, two pages-identifiers on two different pages share the same position if the two pages are separate by the number of pages divided by 2 minus 1. In said embodiments, the position of the page-identifier of page 1 is the same as the page-identifier of page 9; the position of the page-identifier of page 2 is the same as the page-identifier of page 10; the position of the page-identifier of page 3 is the same as the page-identifier of page 11; the position of the page-identifier of page 4 is the same as the page-identifier of page 12; the position of the page-identifier of page 5 is the same as the page-identifier of page 13; the position of the page-identifier of page 6 is the same as the page-identifier of page 14; the position of the page-identifier of page 7 is the same as the page-identifier of page 15; the position of the page-identifier of page 8 is the same as the page-identifier of page 16.

According to embodiments, considering a book comprising n pages, the position of the page-identifier of page x (ranging from 1 to n/2) is the same as the page-identifier of page n/2+x. Said embodiments enable to reduce the number of different locations wherein a page-identifier is positioned in the book for the same number of pages. A larger or a smaller number of pages may be identified with this arrangement.

According to embodiments, two pages-identifiers on two different pages share the same position if the two pages are separated by the same number of pages with respect to the center of the book. In said embodiments, the position of the page-identifier of page 1 is the same as the page-identifier of page 16; the position of the page-identifier of page 2 is the same as the page-identifier of page 15; the position of the page-identifier of page 3 is the same as the page-identifier of page 14; the position of the page-identifier of page 4 is the same as the page-identifier of page 13; the position of the page-identifier of page 5 is the same as the page-identifier of page 12; the position of the page-identifier of page 6 is the same as the page-identifier of page 11; the position of the page-identifier of page 7 is the same as the page-identifier of page 10; the position of the page-identifier of page 8 is the same as the page-identifier of page 9.

According to embodiments, considering a book comprising n pages, the position of the page-identifier of page x (ranging from 1 to n/2) is the same as the page-identifier of page n−x+1. Said embodiments enable to reduce the number of different locations wherein a page-identifier is positioned in the book for the same number of pages. A larger or a smaller number of pages may be identified with this arrangement.

According to embodiments, considering a book comprising n pages, the position of the page-identifier of page x (ranging from 1 to n/2) is the same as the page-identifier of page n−x+1, the page-identifiers are aligned along the bottom edge of the book and the page-identifiers of page x (ranging from 1 to n/2) are disposed from far to near the binding system. It means that the page-identifier of pages 1 and 16 are the furthest from the binding system and the page-identifier of pages n/2 and n/2+1 are the closest to the binding system. The inventor discovered that said embodiment allows that, when the book is open at the center, the page-identifiers the furthest from the binding system are the closest to the sensors of the book. This ensures effective detection of the page-identifier even if the book is distorted (when a book is distorted, the largest distortions occur away from the binding system).

According to embodiments, each page-identifier is configured to correspond with two sensors of the device, one on each side of the device. According to embodiments, each page-identifier is configured to correspond with two sensors of the device, one on each side of the notch 18 of the device. According to embodiments, considering a book comprising n pages, the device comprises n sensors with n/2 sensors being positioned on each side of the device. According to embodiments, considering a book comprising n pages, the device comprises n sensors with n/2 sensors being positioned on each side of the notch 18 of the device. According to embodiments, each page identifier is aligned with a respective sensor when the page is in a first configuration and is aligned with one other respective sensor when the page is in a second configuration. The first configuration differs from the second configuration in that the page lies on the other side of the device. It means that the first configuration differs from the second configuration in that the page is turned. Said embodiment enable to detect when a book is open on a given page and then when a page is turned.

According to embodiments, the page-identifiers are aligned, preferably along an outer edge of the book, such as the bottom side of the book. According to embodiments, a lower edge of a page-identifier lies within a distance from the outer edge of the page.

According to embodiments, the book does not comprise any electronic device or battery. According to embodiments, the book does not comprise any active electronic device or battery. Said embodiments reduce the manufacturing costs, the risk of damages and the mechanical footprint. In addition, the book does not include any battery and does not need to be powered.

The book is preferably made from paperboard-except the second fastening means, the book-identifier, and the page identifiers. According to embodiments, the maximum number of pages of a book is ranging from 6 to 30, preferably from 16 to 26. According to embodiments, the book comprises an even number of pages, such as for instance 12, 14, 16, 18 or 20 pages. According to embodiments, the grammage of the pages is ranging from 200 to 500 g/m$^2$.

Page Detection

According to embodiments, the page-identifier detection device 16 comprises a plurality of sensors used to detect the current page of the book. As mentioned above, the sensors may be inductive sensors, such as inductive coils. The inductive sensors detect the proximity of a page-identifier, such as a metallic marker via magnetic fields produced by an inductive coil. If a metallic marker, such as a page-identifier, is sufficiently close to an excited coil, eddy currents are induced by the metallic marker and the inductive sensor can detect the presence of the metallic marker. Inductive sensing does not require unique tag identification of each page. According to embodiments, the inductive sensor detects if a metallic marker is sufficiently close to the sensor. According to embodiments, the inductive sensor detects if more than one metallic marker, e.g., if one or two metallic markers, is sufficiently close to the sensor. According to embodiments, the inductive sensor detects the number of metallic markers sufficiently close to the sensor.

As in the present invention metallic markers overlap in pairs when the book is closed, knowing which sensors detect a metallic marker on one side of the device is not sufficient to determine the current page. According to embodiments, the controller determines the current page based on the signal from the inductive sensors on the two sides of the device. In said embodiments, the inductive sensor detects if a metallic marker (whatever the number of metallic markers) are sufficiently close to the sensor. Said embodiments will be better understood in view of FIGS. 11 and 12 which described how to determine the current page from a book comprising 16 pages using 16 sensors, 8 sensors being positioned on each side of the device. The same method may be applied to determine the current page from a book comprising n pages using at least n sensors, at least n/2 sensors being positioned on each side of the device. Considering a book with n pages, at any time n/2 inductive sensors on one side of the device detect a page-identifier. The page is then determined based on the sensors positioned on the other side of the device.

Considering a closed book with n pages positioned on the second side of the device, then n/2 sensors on the second side of the device detects a page-identifier. The current page is determined based on the number of sensors detecting a page-identifier on the first side. If one sensor on the first side detects a page-identifier, one page has been turned, if two sensors on the first side detect a page-identifier, two pages have been turned, and so forth until n/2 inductive sensors on a first side of the device detect a page-identifier meaning that n/2 pages have been turned. Then, the current page is determined based on the number of sensors on the second side detecting a page-identifier. If n/2−1 sensors on the second side detect a page-identifier, it means that n/2+1 pages have been turned, if n/2−2 sensors on the second side detect a page-identifier, it means that n/2+1 pages have been turned, and so forth until no sensor on the second side detect a page-identifier, meaning that all the pages have been turned.

According to embodiments, the inductive sensors detect if one or two metallic markers are sufficiently close to the sensor. Thus, the inductive sensors can detect if zero, one or two page-identifier are close to the sensor. Compared to the previous embodiment, said embodiment enables to detect error in the book (missing page, etc.) and increases reliability.

FIG. 11 illustrates how to determine the current page of a book when the position of the page-identifier of page x (ranging from 1 to n/2) is the same as the page-identifier of page n/2+x.

FIG. 12 illustrates how to determine the current page of a book when the position of the page-identifier of page x (ranging from 1 to n/2) is the same as the page-identifier of page n−x+1.

As it is apparent to the skilled artisan, other page detection methods may be envisioned using the inductive sensors the device.

Card

Figure 7:
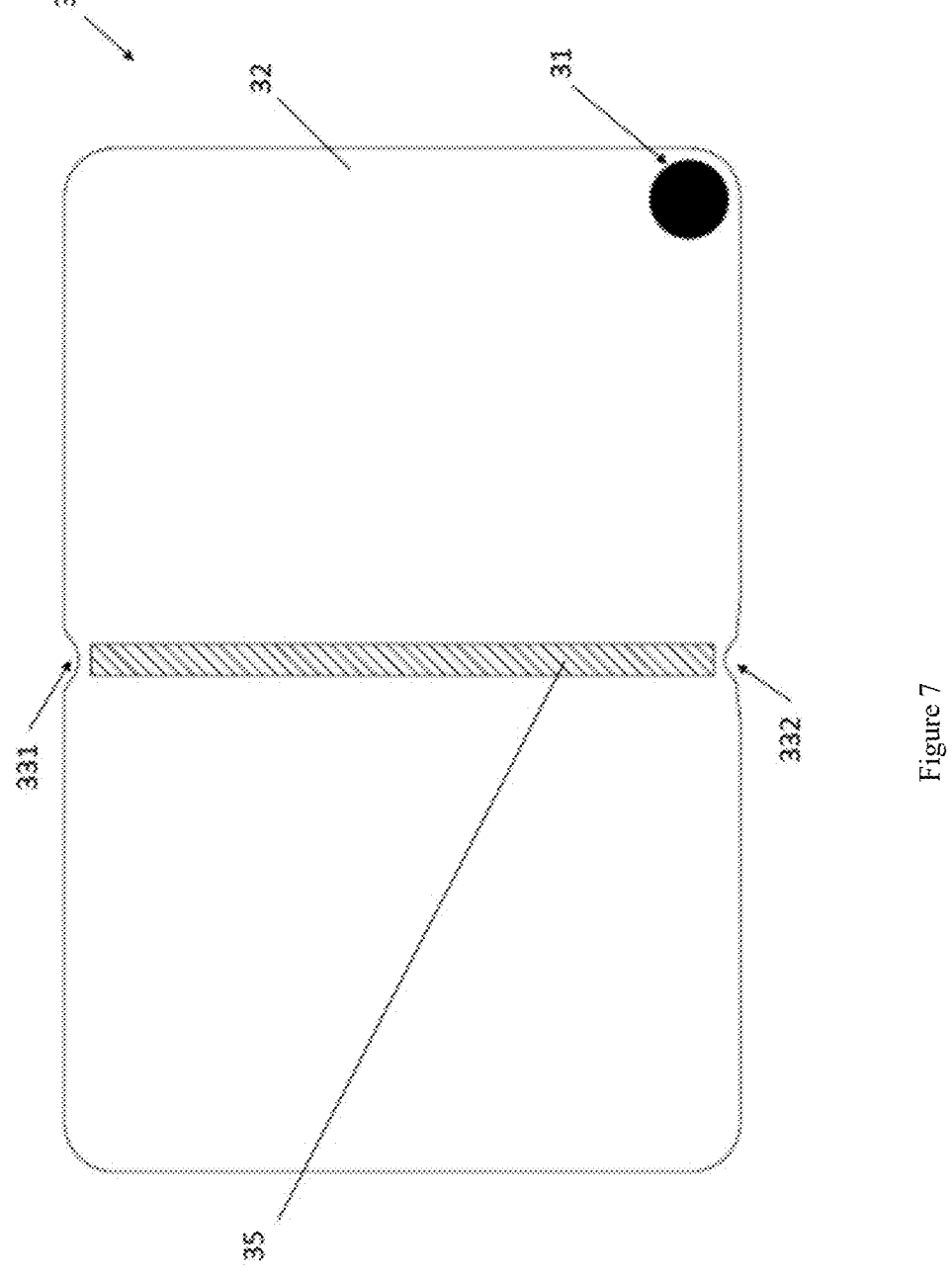
FIG. 7 illustrates a front view of a book according to
embodiments of the second aspect of the invention.
Figure 7A:
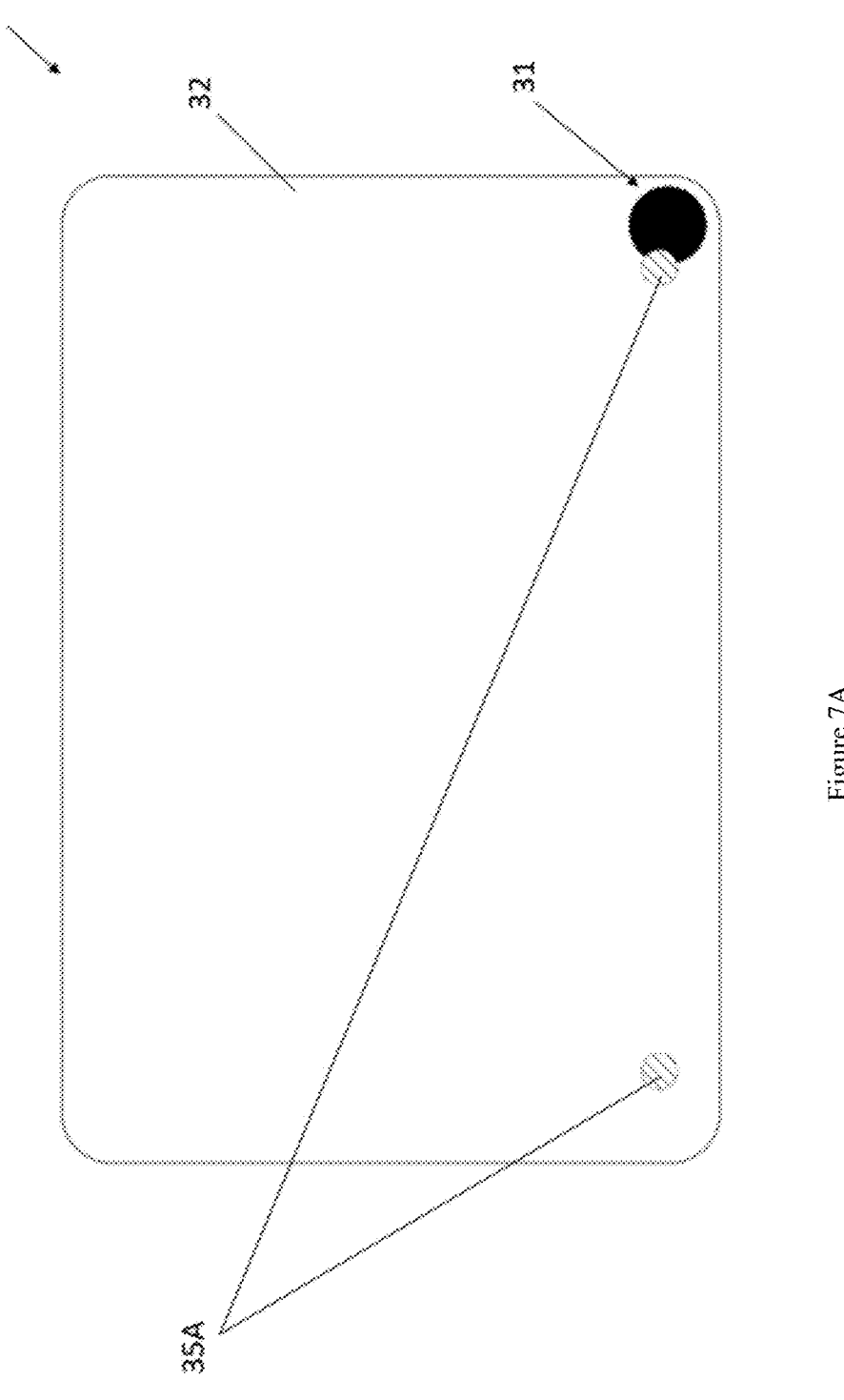
FIG. 7A illustrates a front view of a book according to
other embodiments of the second aspect of the invention.

Referring to FIGS. 7 and 7A, a book 3 according to embodiments of the invention is depicted. The book comprises a single page 32. The book 3 is also referred to as a card in this embodiment. The card comprises a card-identifier 31 and a second fastening means 35. As the card comprises a single page, there is no need for a page-identifier in addition to the card-identifier 31. According to embodiments, the page 32 covers the same surface as an open book 2.

According to embodiments, the card comprises one card-identifier 31. According to embodiments, the card-identifier is integrated in the card. For instance, the card comprises two sheets forming a card (for instance two sheets glued together) and the card-identifier is embedded into the two sheets. According to embodiments, the car-identifier is not visible. The card-identifier 31 is configured to correspond with a book-identifier detection device 12 when the card is positioned on the device so that the controller can identify the card. According to embodiments, the card comprises content on one side or on each side. A story, a picture and/or a game may be printed on one side or on each side of the page. According to embodiments, the controller is configured to detect on which side the card is positioned on the device by used of the two book-identifier detection device 12 of the device. According to embodiment, the card-identifier is configured to correspond with a first book-identifier detection device in a first configuration and to correspond with a second book-identifier detection device in a second configuration. According to embodiments, the first configuration of the card differs from the second configuration in that the card is returned along its smaller side.

According to embodiments as depicted in FIG. 7, the card comprises a polarising notch 331, 332 so that the card cannot be positioned on the device after being turned along the longer side—as detailed below.

According to embodiments as depicted in FIG. 7A, the card does not comprise a polarising notch.

The second fastening means 35 are configured to be fastened to the first fastening means 15.

According to embodiments, the second fastening means is a passive fastening means, such as a metallic bar 35 as depicted in FIG. 7, configured to be fastened to an active first fastening means, such as a magnet.

According to embodiments, the second fastening means is an active fastening means, such as two magnets 35A as depicted in FIG. 7A located apart from each other, preferably on each side of the card.

According to embodiments, the second fastening means comprises an active fastening means and a passive fastening means.

According to embodiments, the second fastening means is not visible. According to embodiments, the second fastening means is integrated in the card. For instance, the card comprises two sheets forming a card (for instance two sheets glued together) and the second fastening means are embedded into the two sheets. According to embodiments, the second fastening means is configured to cooperate with the notch 18 of the device. According to embodiments, the second fastening means are configured to be received inside the notch 18 of the device.

According to embodiments as depicted in FIG. 7, the card comprises a polarising notch 361, 362 configured to cooperate with a polarising stop 191, 192 on the device to ensure proper positioning and orientation of the card on the device. According to embodiments, the polarising notch is positioned on one side of the card. According to embodiments, the card comprises at least two polarising notches 361, 362 configured to cooperate with at least two polarising stops 191, 192 on the device, preferably the polarising notches are positioned on different side of the card. According to the depicted embodiment, a first polarising notch 361 is positioned on the superior side and a second polarising notch 362 is positioned on the inferior side of the card. According to embodiments, the first polarising notch and the second polarising notch have a different shape.

According to embodiments, the card does not comprise any electronic device or battery—except the card-identifier 31. According to embodiments, the card does not comprise any active electronic device or battery. Said embodiments reduce the manufacturing costs, the risk of damages and the mechanical footprint. In addition, the card does not include any battery and does not need to be powered.

The card is preferably made from paperboard-except the second fastening means and the card-identifier.

Interactive Book System

Figure 8:
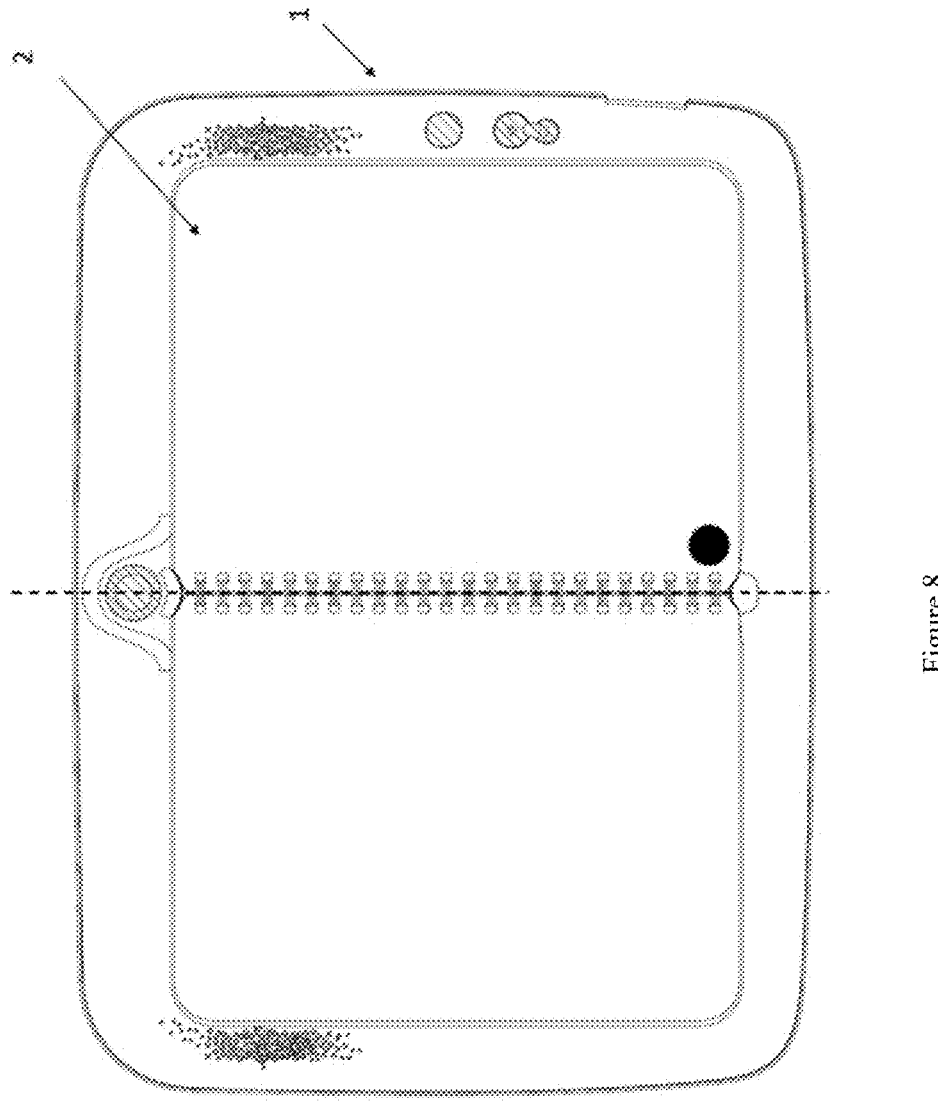
FIG. 8 illustrates a front view of an interactive book
system according to embodiments of the third aspect of the
invention.
Figure 8A:
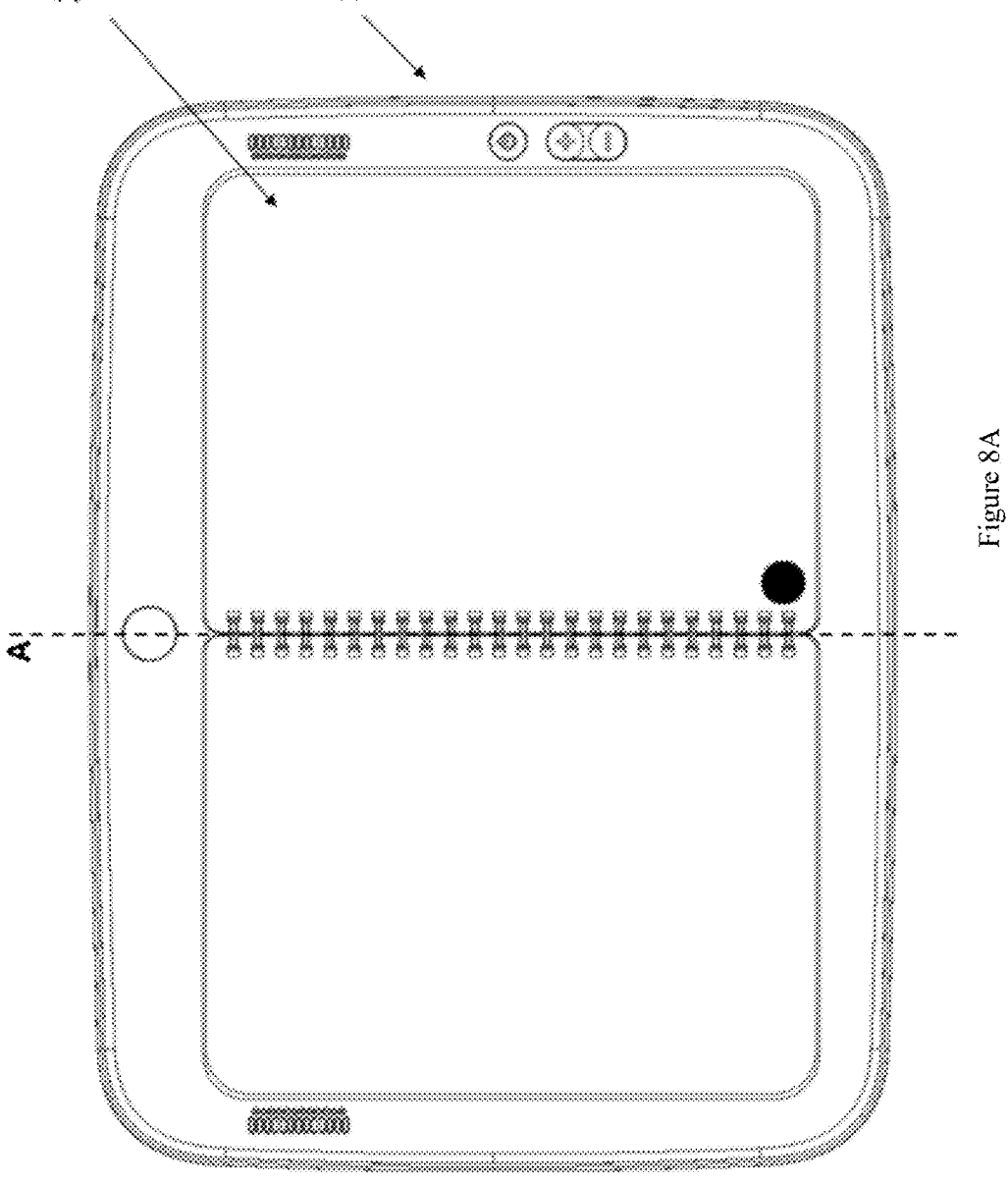
FIG. 8A illustrates a front view of an interactive book
system according to other embodiments of the third aspect
of the invention.
Figure 8B:
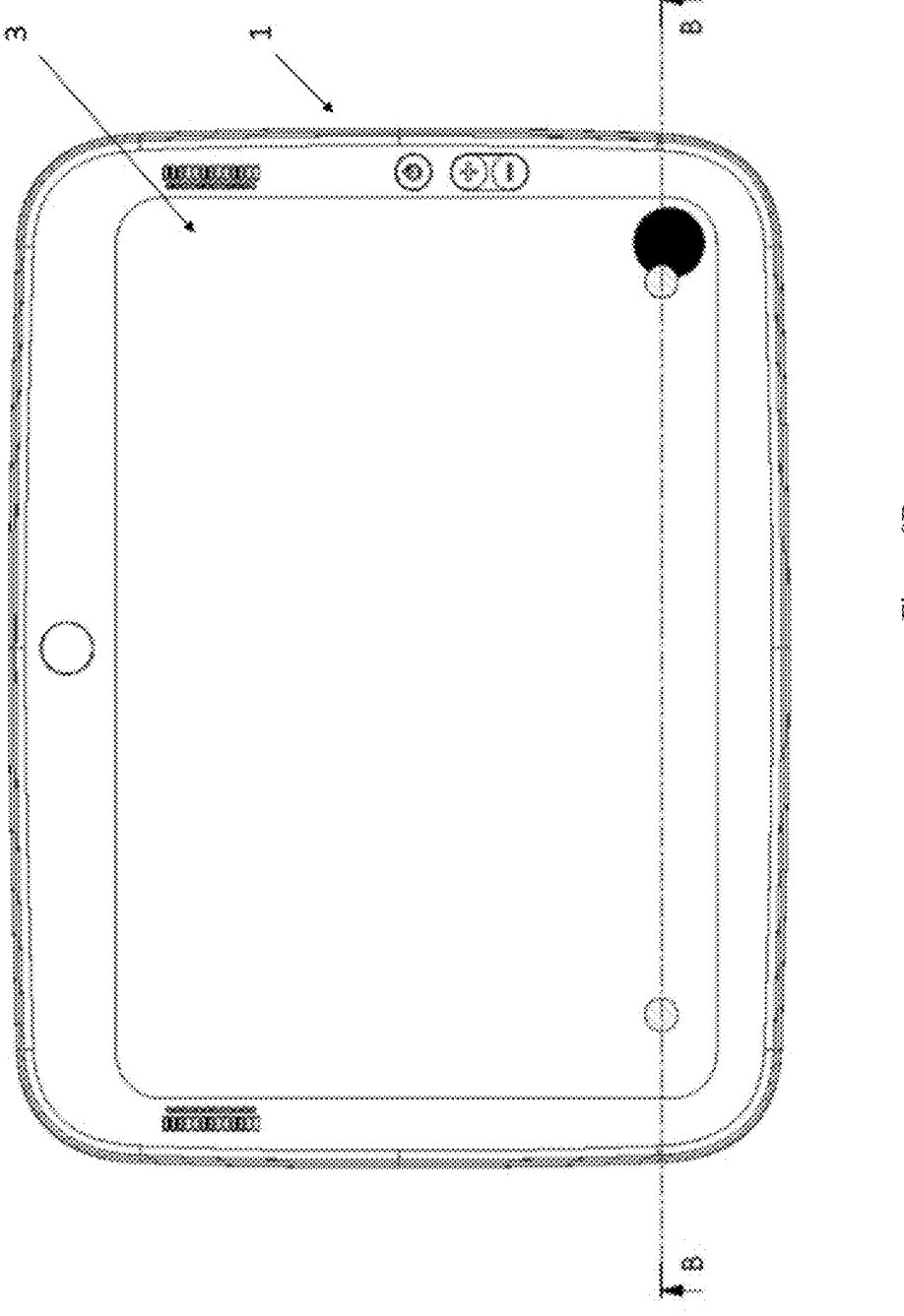
FIG. 8B illustrates a front view of an interactive book
system according to other embodiments of the third aspect
of the invention, wherein the book is a card.

Referring to FIGS. 8, 8A, 8B, 9, 9A and 9B, interactive book systems according to the invention are depicted. As depicted in FIGS. 8 and 8A, the interactive book system comprises a device 1 and a book 2. As depicted in FIG. 8B, the interactive book system comprises a device 1 and a card 3.

Figure 9:
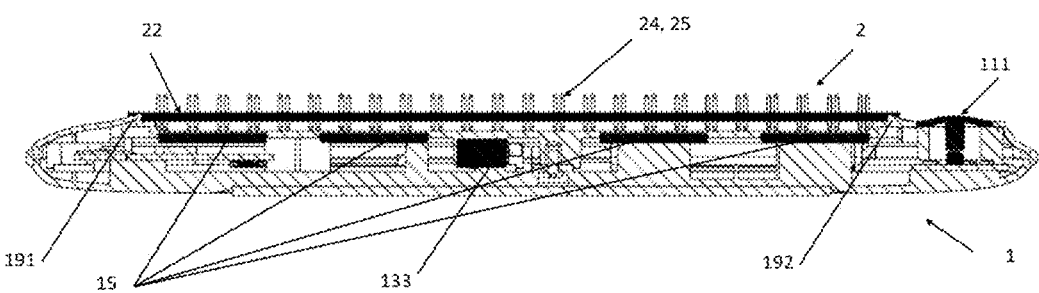
FIG. 9 illustrates a cross-sectional view of the interactive
book system along the dotted line in FIG. 8.
Figure 9A:
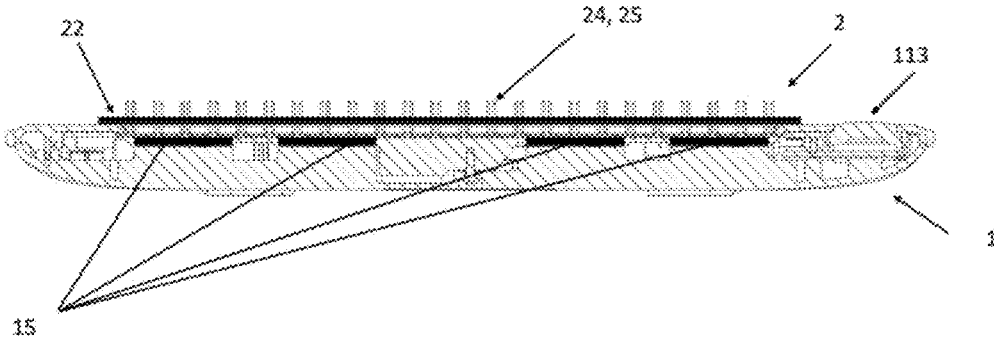
FIG. 9A illustrates a cross-sectional view of the interac-
tive book system along line A in FIG. 8A.

As illustrated in FIGS. 9 and 9A, the first fastening means 15 of the device cooperate with the second fastening means 25 of the book to fasten the book with the device, here using magnetic attraction. FIG. 9 further illustrates the cooperation of the polarising stops 191, 192 with the book.

Figure 9B:
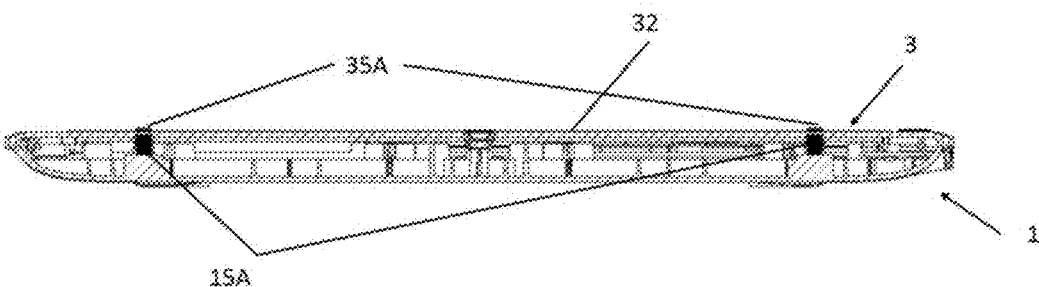
FIG. 9B illustrates a cross-sectional view of the interac-
tive book system along line B-B in FIG. 8B.

As illustrated in FIG. 9B, the first fastening means 15A of the device cooperate with the second fastening means 35A of the card to fasten the card with the device, here using magnetic attraction.

Figure 10:
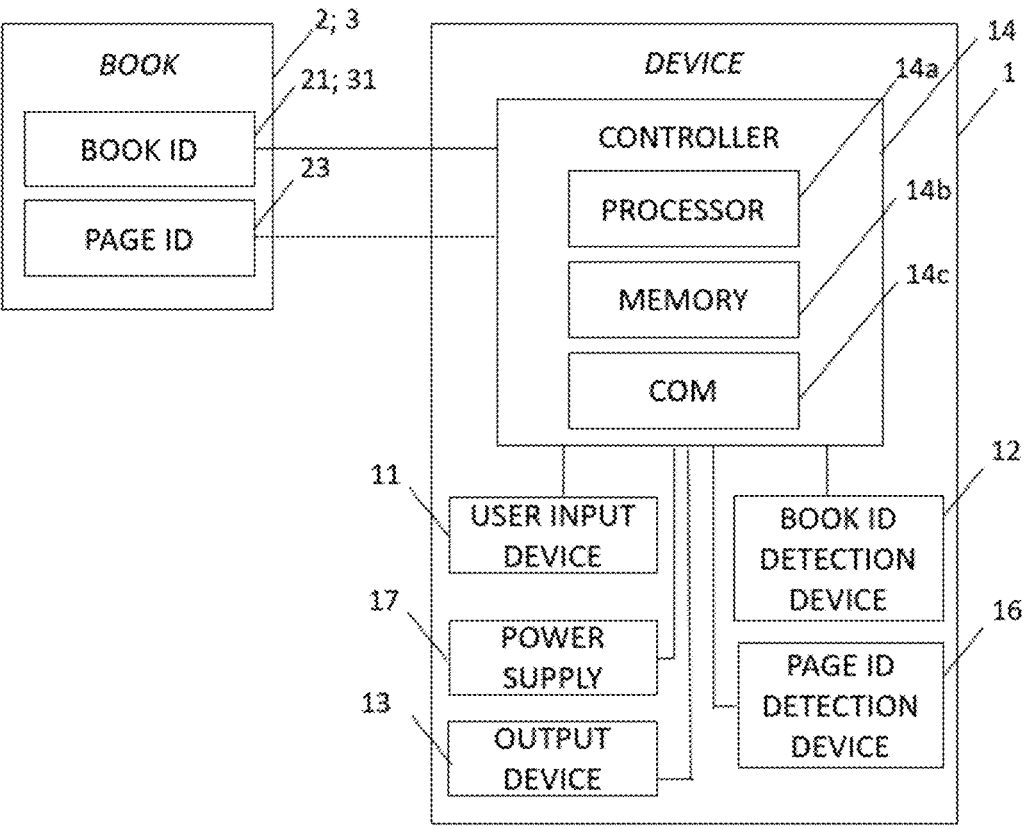
FIG. 10 illustrates a schematic diagram of the interactive
book system according to embodiments of the third aspect of
the invention.

Referring to FIG. 10, a schematic diagram of an interactive book system is shown.

The interactive book system comprises a book 2; 3 according to embodiments of the invention and a device 1 according to embodiments of the invention. Each of the user input detection device 11, the book-identifier detection device 12 and the page-identifier detection device 16 are connected to a controller 14. The controller 14 comprises a processor 14a which may be a microprocessor, a memory 14b which may be random access memory (RAM) for storing executable code for implementing the user input, page and book detection according to embodiments the invention or a read only memory (ROM) for storing computer programs for implementing the user input, page and book detection according to embodiments of the invention; and a communication interface 14c typically connected to a communication network over which digital data are transmitted or received. The communication interface may a single communication interface or composed of a set of different network interfaces, for instance a Bluetooth communication interface or a Wi-Fi communication interface. The controller 14 is connected to the book-identifier detection device and configured to communicate with the book-identifier detection device to retrieve the identification of the book. The controller is further connected to page-identification detection device and configured to communicate with the page-identification detection device to retrieve the identification of the open page of the book. The controller is further connected to user input detection device and configured to communicate with the user input detection device to retrieve the user input. According to embodiments, the controller is connected to the touch panel and configured to communicate with the user input detection device to retrieve the user input on the open page of the book.

The memory 14b is configured to store a content associated with the book-identifier, the page-identifier and predefined user input signals. The device 1 further comprises an output device 13 connected to the controller 14. The controller 14 is configured to produce an output signal on the output device depending on the content associated in memory 14*b* with the book-identifier, the page-identifier and the user input signal. According to embodiments, the output device 13 may be a speaker 131, a lighting device 132 and/or a haptic device 133 and/or any other output device known to one skilled in the art. The device is further connected to a power supply. The device may be AC or battery powered.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A device configured for receiving a book, said book comprising a book-identifier and a plurality of pages; wherein said device comprises:

a user input detection device;

a book-identifier detection device configured to detect the book-identifier of the book;

an output device;

a controller connected to the user input detection device, the book-identifier detection device and the output device; and a first fastening means configured to removably fasten the device to the book;

wherein the controller is configured to determine the user input based on a signal from the user input detection device; and wherein the controller is configured to determine which book is fastened to the device based on the signal from the book-identifier detection device;

wherein each page of the book that needs to be identified comprises a page-identifier; and, wherein said device further comprises:

a first side configured to receive the pages of the book on a first side and a second side configured to receive the pages of the book on a second side;

a page-identifier detection device configured to detect the page-identifiers of the book, the page-identifier detection device comprising a plurality of sensors, half of the sensors being disposed on each side of the device, each sensor being configured to correspond with a page-identifier of the book, preferably with two page-identifiers of the book; and wherein the controller is connected to the page-identifier detection device and configured to determine on which page the book is open based on the signal from the page-identifier detection device, comprising the signal from the sensors on the two sides of the device, wherein at any time a first half of two halves of the sensors detect a page identifier, and the controller is configured to determine the page based on a second half of the two halves of the sensors providing less signal than the first half.

2. The device according to claim 1, wherein the number of sensors is equal to the number of page-identifiers of the book.

3. The device according to claim 1, wherein the user input detection device comprises a resistive touch panel or a capacitive touch panel and wherein the controller is configured to determine the user input based on the signal from the resistive touch panel or the capacitive touch panel.

4. The device according to claim 1, wherein the device comprises two book-identifier detection devices.

5. The device according to claim 1, wherein the book-identifier detection device comprises a near-field communication (NFC) tag reader or a radio-frequency identification (RFID) tag reader and wherein the controller is configured to determine which book is fastened to the device based on the signal from the near-field communication (NFC) tag reader or the radio-frequency identification (RFID) tag reader.

6. The device according to claim 1, wherein the first fastening means comprises a magnetic or ferrous material configured to fasten the book to the device using magnetic attraction.

7. The device according to claim 1, wherein the output device comprises a speaker, a lighting device and/or a haptic device; wherein the output device is connected to the controller; and wherein the device further comprises an on-off button, a volume button and/or a button configured to select a language.

8. An interactive book system comprising a device configured for receiving a book, said book comprising a book-identifier and a plurality of pages; wherein said device comprises:

a user input detection device;

a book-identifier detection device configured to detect the book-identifier of the book;

an output device;

a controller connected to the user input detection device, the book-identifier detection device and the output device; and a first fastening means configured to removably fasten the device to the book;

wherein the controller is configured to determine the user input based on a signal from the user input detection device; and wherein the controller is configured to determine which book is fastened to the device based on the signal from the book-identifier detection device;

wherein each page of the book that needs to be identified comprises a page-identifier; and, wherein said device further comprises:

a first side configured to receive the pages of the book on a first side and a second side configured to receive the pages of the book on a second side;

a page-identifier detection device configured to detect the page-identifiers of the book, the page-identifier detection device comprising a plurality of sensors, half of the sensors being disposed on each side of the device, each sensor being configured to correspond with a page-identifier of the book, preferably with two page-identifiers of the book; and wherein the controller is connected to the page-identifier detection device and configured to determine on which page the book is open based on the signal from the page-identifier detection device, comprising the signal from the sensors on the two sides of the device;

wherein at any time a first half of two halves of the sensors detect a page identifier, and the controller is configured to determine the page based on a second half of the two halves of the sensors providing less signal than the first half;

and a book configured to be fastened to the device; wherein the book comprises:

a book-identifier;

a binding system a plurality of pages connected to the binding system, wherein each page that needs to be identified comprises a page-identifier, and wherein for each page of the book, the page-identifier overlaps with the page-identifier of one different page when the book is closed and viewed from the above; and a second fastening means configured to removably fasten the book to the first fastening means of the device.

9. The interactive book system according to claim 8, wherein the page-identifier detection device of the device comprises a plurality of sensors, and wherein each page-identifier is configured to correspond with a sensor, preferably with two sensors of the device.

10. The interactive book system according to claim 8, wherein the book-identifier comprises a near-field communication (NFC) tag or a radio-frequency identification (RFID) tag.

11. The interactive book system according to claim 8, wherein the second fastening means comprises a magnetic or ferrous material configured to fasten the book to the device using magnetic attraction, preferably the second fastening means consist of a metallic ring binding system.

* * * * *